US005353503A

United States Patent [19]

Garot

[11] Patent Number: 5,353,503
[45] Date of Patent: Oct. 11, 1994

[54] METHOD OF PROVIDING A FIRE-PROOF AND/OR WEAR RESISTANT LINING

[76] Inventor: Wouter Garot, Sportlaan 99 NL-2566GN, The Hague, Netherlands

[21] Appl. No.: 935,036

[22] Filed: Aug. 25, 1992

[30] Foreign Application Priority Data

Aug. 26, 1991 [NL] Netherlands ........................ 9101436

[51] Int. Cl.[5] ........................................ B23P 19/04

[52] U.S. Cl. ........................................ 29/897.3; 29/460; 29/527.2; 264/274

[58] Field of Search ........................ 29/897, 897.3, 460, 29/527.2, 530; 264/271.1, 273, 274, 277, 279.1

[56] References Cited

U.S. PATENT DOCUMENTS 4,284,447 8/1981 Dickens et al. ................ 264/274 X
4,394,201 7/1983 Haeussler ........................ 264/274 X
4,526,739 7/1985 Migliacci et al. .................. 264/228

*Primary Examiner*—Timothy V. Eley
*Attorney, Agent, or Firm*—Seed and Berry

[57] ABSTRACT

Disclosed is a method of providing a fireproof and/or wear-resistant lining on objects made of metal, whereby pins are welded onto the object in question, after which anchoring means are screwed on said pins. Subsequently, the fireproof and/or wear-resistant lining material, in its plastic form, is applied to the object around the anchoring means and allowed to cure. The invention furthermore relates to an anchoring means intended for being used when applying the method according to the invention, the anchoring means having a polygonal base portion, whereby lips, which extend transversely to said base portion, join the edges of the base portion.

7 Claims, 1 Drawing Sheet

METHOD OF PROVIDING A FIRE-PROOF AND/OR WEAR RESISTANT LINING

TECHNICAL FIELD

The invention relates to a method of providing a fireproof and/or wear-resistant lining on objects made of metal.

BACKGROUND OF THE INVENTION

In engineering it is common practice to provide parts made of metal, which are subjected to high temperatures and/or mechanical and/or chemical loads, such as vessels or the like used in the cracking of petroleum products, with a lining of a fireproof and/or wear-resistant material. In order to obtain a good anchoring of said fireproof and/or wear-resistant lining to the object in question, it is usual to provide anchoring means, in the shape of a grid made of folded, interconnected metal strips, on the wall on which the lining is to be provided, said strips bounding at least substantially hexagonal recesses, which are filled with the still plastic fireproof and/or wear-resistant material subsequently to the grid being welded on to the object in question (AU-374917).

The manufacture of such a grid, whereby the strips are usually connected together by means of lips cut from said strips, which lips are inserted into openings provided in neighboring strips, is already costly per se. Also the attachment of such a grid on the object to be lined is a laborious activity, since the strips must be welded on to the object in question by hand. In addition to that it is very difficult, in view of the large number of welds that have to be made, to maintain a uniform quality.

Also, when repairing local damage, this known construction presents difficulties.

The application of the plastic lining material in said grid-shaped anchoring means is very difficult and time-consuming. The risk of faults is very great, since the lining of said anchoring means is entirely based on hand work. An adequate densification of the fireproof and/or wear-resistant materials and a uniform high quality of the lining is very difficult to achieve.

SUMMARY OF THE INVENTION

The object of the invention is to obtain a method of the above kind, wherein the drawbacks of the previously used method can be avoided.

According to the invention this can be achieved using pins, whose ends remote from the object are threaded, welded onto the object in question, after which anchoring means are screwed onto said pins and subsequently the fireproof and/or wear-resistant lining material, in its plastic form, is applied to the object and around the spaced-apart anchoring means and allowed to cure.

The pins can be quickly welded, by means of a suitable tool, onto the wall of the object to be lined in a simple manner, which is known per se, by pressing the ends of the pins to be welded against the wall and heating said ends, so that a quick attachment of the pins to the wall to be lined can be effected while maintaining a constant quality of the welds. Then the anchoring means, which are comparatively small, can be quickly screwed on the pins into the desired position with respect to the object, after which the fireproof lining material is applied.

Replacing the old anchoring systems by the anchoring means according to the invention can technically be realized in a very simple manner, while achieving a high quality. This is also possible with combinations and/or connections of different anchoring systems.

In case of damage the anchoring means only have to be replaced locally, if necessary.

A further advantage of the method according to the invention is that care can be taken that the anchoring means are disposed at some distance from the wall to be lined with a fireproof material, so that only the pins secured to the wall to be lined are in direct contact with the wall, as a result of which a considerably reduction of heat transfer is obtained in comparison with the conventional constructions. In addition to that also the anchoring means are fully embedded in the fireproof material thereby, which appears to reduce the risk of damage to the fireproof lining.

A suitable selection of the quality and the thickness of the material and of the profile will furthermore considerably reduce the amount of erosion of the anchoring means in comparison with the construction used so far.

It is noted that from FR-A-2,336,651 a construction is known for providing a fireproof lining on the main brickwork of a kiln. Pins, which extend through the brickwork, are thereby secured to a wall of the kiln. Cup-shaped means, which are located in recesses in the brickwork, are secured to the ends of the pins by means of nuts screwed on said pins. Said cup-shaped means are covered by means of plates, which are provided with resilient fingers engaging the cup-shaped means. Pin-shaped means, which are embedded in the fireproof lining, are secured to the sides of the plates remote from the cup-shaped means.

The pins secured to the kiln wall will not be sufficient to achieve an adequate anchoring of the main brickwork to the kiln wall. Further anchoring means for the main brickwork are not shown, however.

For the anchoring of the fireproof lining to the main brickwork both cup-shaped means and, separate therefrom, plates having resilient fingers and pin-shaped means are required, which leads to a comparatively costly construction. Furthermore, an adequate fixing and adjustment of the plates with respect to the cup-shaped means cannot be obtained, so that there is a risk that when the fireproof lining is being provided the plates and the pin-shaped means secured thereto are forced from their intended position, as a result of which the intended uniform anchoring of the fireproof lining may be lost.

The invention will be explained in more detail hereafter with reference to the accompanying figures.

DETAILED DESCRIPTION OF THE INVENTION

Figure 3:
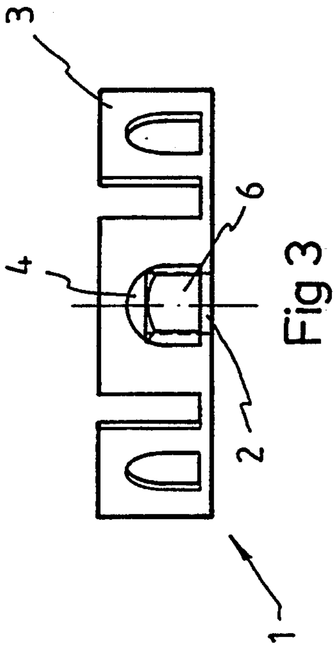
FIG. 3 is a side view of the anchoring means of FIG. 2.
Figure 2:
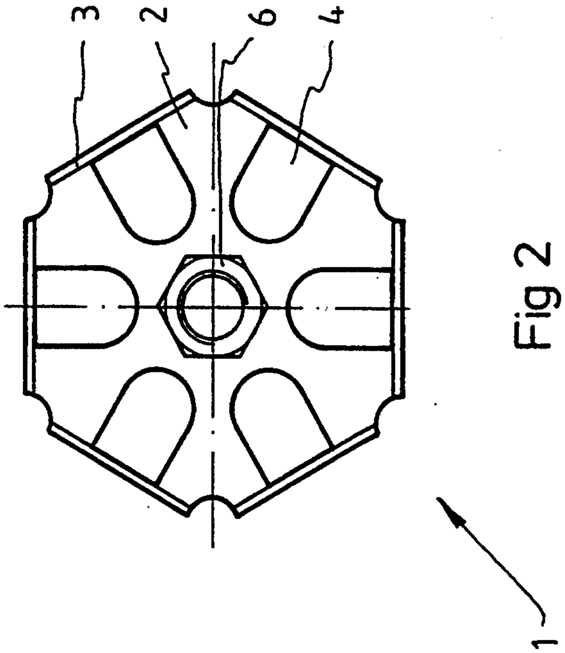
FIG. 2 is a plan view of the anchoring means, which is made of the plate portion shown in FIG. 1.
Figure 1:
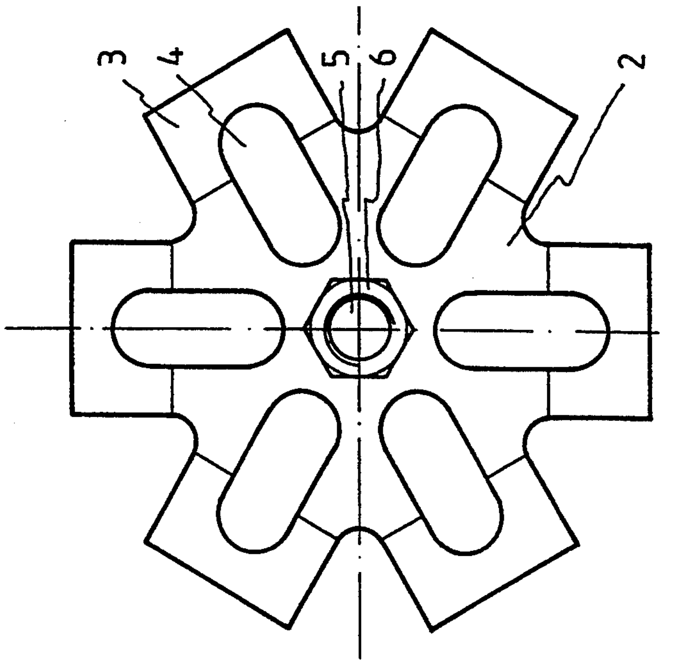
FIG. 1 is a view of a blanked-out plate portion, from which an anchoring means according to the invention is made, with a nut welded in the center thereof.

The anchoring means 1 shown in FIGS. 2 and 3 is made of the blanked-out plate portion shown in FIG. 1.

As appears from FIG. 1, the blanked-out plate portion comprises an at least substantially hexagonal base portion 2. Rectangular lips 3 join the six sides of said base portion. Between the successive lips the corner points of the base portion are rounded as shown in FIG. 1.

Six slotted holes 4, which extend radially with respect to the center of said base portion, are furthermore provided in the blanked-out plate portion, said slotted holes extending into the base portion 2 along part of their length and into the lips 3 along part of their length. Furthermore, a hole 5 is provided in the center of the base portion 2, while near said hole 5 a nut 6 is welded onto the base portion, in such a manner that the central axis of said nut 6 coincides with the central axis of the hole 5.

The lips 3 are bent over through an angle of 90° with respect to the base portion 2, so as to form the anchoring portion 1, as will be apparent from FIGS. 2 and 3.

Figure 4:
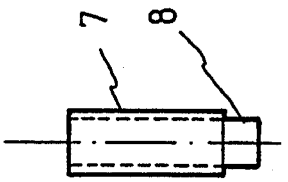
FIG. 4 is a side view of a pin, which is used for securing an anchoring means to an object to be provided with a fireproof and/or wear-resistant lining.

First threaded pins, e.g., being shaped as shown in FIG. 4, are welded in a regular pattern onto the wall of an object to be covered with the fireproof and/or wear-resistant lining. As appears from FIG. 4, such pins are at one end provided with a shaft portion 8, whose diameter is slightly smaller than the diameter of the threaded portion of the pin 7. Such pins can be welded onto the metal wall of the object to be lined in a usual manner, using a tool known per se, by pressing the ends 8 with a certain force against the respective wall with the tool in question and simultaneously heating said ends.

In view of the fact that the pressing force and the passed current are determined by the tool itself there can so be assured a good quality of the welds for mounting the pins on the object.

After the desired number of pins 7 have been welded in the desired pattern onto the object to be lined, an anchoring means 1 as shown in FIGS. 2 and 3 can be screwed on each of said pins 7. Preferably, the nuts 6 are made in such a manner, which is known per se, that the nuts 6 clamp down tightly on the pins 7. The arrangement of the anchoring means 1 is thereby preferably chosen such that a certain interspace remains between the wall to be provided with a fireproof lining and the portions of the anchoring means facing the wall in question. When subsequently the still plastic fireproof and-/or wear-resistant material is provided, also the space between the anchoring means and the wall to be lined will be filled with fireproof and/or wear-resistant material, which can also penetrate through the slotted holes 4, so that an adequate and complete embedding of the anchoring means in the fireproof and or wear-resistant material, and thus a good adherence of the fireproof and/or wear-resistant lining to the object to be lined can be effected.

I claim:

1. A method of providing a fireproof and/or wear-resistant lining on an object made of metal, comprising:
 welding pins to the object, each pin having a threaded end remote from the object;
 screwing anchoring means on said pins;
 applying the fireproof and/or wear-resistant lining material, in a plastic form, to the object and around the anchoring means; and
 curing the fireproof and/or wear-resistant lining material.

2. The method according to claim 1 wherein the screwing step includes screwing said anchoring means on the pins in such a manner, that a certain amount of space remains between the object and the anchoring means.

3. A method of providing a fireproof and/or wear-resistant lining on an object made of metal, comprising:
 welding pins to the object, each pin having a threaded end remote from the object;
 screwing anchoring means on said pins wherein the anchoring means includes a flat polygonal plate portion, the method further including bending over outermost parts of the plate portion about folding lines including an angle with each other, through an angle of ±90 degrees with respect to a central portion of the plate portion;
 applying the fireproof and/or wear-resistant lining material, in a plastic form, to the object and around the anchoring means; and
 curing the fireproof and/or wear-resistant lining material.

4. A method of providing a fireproof and/or wear-resistant lining on an object, comprising the steps of:
 attaching pins onto the object, each of the pins having threading at an end remote from the object;
 screwing anchoring means on the threaded ends of said pins wherein the screwing step includes screwing said anchoring means onto the pins to a position where a predetermined gap remains between the object and said anchoring means, said predetermined gap being sufficient to permit the fireproof and/or wear-resistant material to be applied between the anchoring means and the object when said anchoring means are screwed onto said pins wherein the anchoring means includes a polygonal base portion having a threaded aperture therethrough, a plurality of lips extending from and perpendicular to said polygonal base portion, and a plurality of slotted holes passing through a portion of said lips wherein the method further comprises the step of forming the lips perpendicular to the polygonal base portion;
 applying the fireproof and/or wear-resistant lining material, in a plastic form, around the anchoring means; and
 curing the fireproof and/or wear-resistant material.

5. A method of providing a fireproof and/or wear-resistant lining on an object, comprising the steps of:
 attaching pins onto the object, each of the pins having threading at an end remote from the object;
 forming anchoring means by bending an outermost part of a flat polygonal plate portion through a predetermined angle;
 screwing the anchoring means on the threaded ends of said pins;
 applying the fireproof and/or wear-resistant lining material, in a plastic form, around the anchoring means; and
 curing the fireproof and/or wear-resistant material.

6. The method according to claim 5 wherein the screwing step includes screwing said anchoring means onto the pins to a position where a predetermined gap remains between the object and said anchoring means, said predetermined gap being sufficient to permit the fireproof and/or wear-resistant material to be applied between the anchoring means and the object when said anchoring means are screwed onto said pins.

7. The method of claim 6 wherein the flat polygonal plate portion includes a polygonal base portion, a plurality of lips extending perpendicularly from the polygonal base portion, a plurality of slotted holes extending through a portion of said lips and a threaded aperture extending through the polygonal base portion and wherein the step of screwing includes screwing the threaded aperture onto the pin threading.

* * * * *